United States Patent [19]

Duttarer

[11] 4,136,892
[45] Jan. 30, 1979

[54] METHOD OF CONNECTING VEHICLE MODULES

[75] Inventor: Ralph M. Duttarer, St. Joseph, Mich.
[73] Assignee: Clark Equipment Company, Buchanan, Mich.
[21] Appl. No.: 824,461
[22] Filed: Aug. 15, 1977
[51] Int. Cl.² .............................................. B60D 1/00
[52] U.S. Cl. .................................. 280/479 R; 180/12
[58] Field of Search ................... 280/477, 479 R, 421, 280/423 R, 427; 180/11, 12

[56] References Cited

U.S. PATENT DOCUMENTS 3,854,542  12/1974  Jesswein et al. ........................ 180/12

FOREIGN PATENT DOCUMENTS 900027  11/1953  Fed. Rep. of Germany ........... 280/481
957939   5/1964  United Kingdom ................ 280/423 R

*Primary Examiner*—John A. Pekar
*Attorney, Agent, or Firm*—Kenneth C. Witt

[57] ABSTRACT

A method for connecting together a tractor module and an implement module to form a complete vehicle. The tractor module includes a first coupling portion and a source of pressurized hydraulic fluid. The implement module includes a frame, a second coupling portion on the frame, a hydraulically operated movable structure on the frame and legs arranged to be selectively located between the hydraulically operated structure and the ground for supporting the implement module at rest. In carrying out the method the tractor module is moved adjacent the vehicle module so that the two coupling portions are in confronting relation. The source of pressurized hydraulic fluid on the tractor module is connected to the hydraulic actuators for the hydraulically operated structure on the implement module and the frame of the implement module is thereby moved relative to the hydraulically operated structure to get the two coupling portions in position to be joined. The tractor module is then moved toward the implement module to mesh the two coupling portions together.

2 Claims, 3 Drawing Figures

METHOD OF CONNECTING VEHICLE MODULES

The Government has rights in this invention pursuant to Contract No. DAAE07-75-C-0051 awarded by the Department of Defense.

BACKGROUND OF THE INVENTION

1. Field of the Invention

This invention relates to a method for connecting together a tractor module and an implement module to form a complete vehicle.

2. Description of the Prior Art

U.S. Pat. No. 3,563,329 Licari, dated Feb. 6, 1971, is illustrative of the type of vehicle involved, that is, one comprising a tractor module and an implement module which can be readily connected together and disconnected.

SUMMARY OF THE INVENTION

The method of connecting together a tractor module and an implement module to form a complete vehicle. The tractor module includes a first coupling portion and a source of pressurized hydraulic fluid, and the implement module includes a frame having a second coupling portion thereon along with a hyraulically operated movable structure on the frame portion and legs arranged to be selectively located between the hydraulically operated structure and the ground for supporting the implement module at rest. To carry out the method the tractor module is moved adjacent the vehicle module so that the two coupling portions are in confronting relation. Then the source of pressurized hydraulic fluid on the tractor module is connected to the hydraulic actuators on the implement module. Utilizing such source of pressure the frame of the implement module is adjusted by moving it relative to the hydraulically operated structure to get the two coupling portions in position for coupling, and then the tractor module is moved toward the implement module to mesh the two coupling portions together.

DESCRIPTION OF A PREFERRED EMBODIMENT

Figure 1:
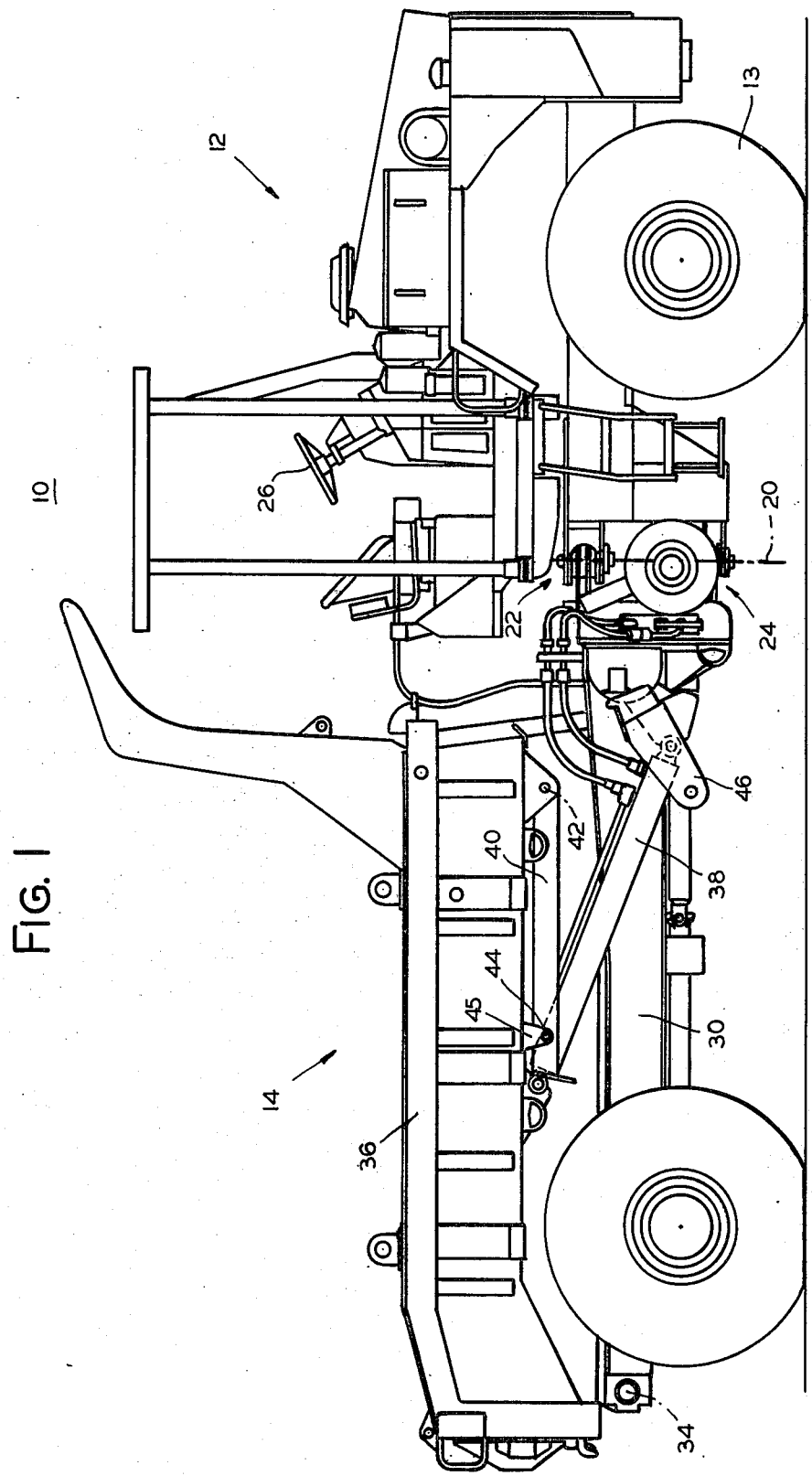
FIG. 1 is a side elevational view of a complete vehicle comprising two separate vehicle modules connected according to the method of the present invention.

Referring to FIG. 1 of the drawing, there is shown a complete articulated vehicle which is indicated generally by the numeral 10 and is composed of two separable parts, a tractor module indicated by the numeral 12 and an implement module indicated by the numeral 14. The two modules are adapted to be connected according to the method of the present invention. The implement module illustrated is a dump body module which, when coupled to the tractor module as shown in FIG. 1, forms a complete dump truck vehicle for the transportation and dumping of dirt or other material.

Figure 3:
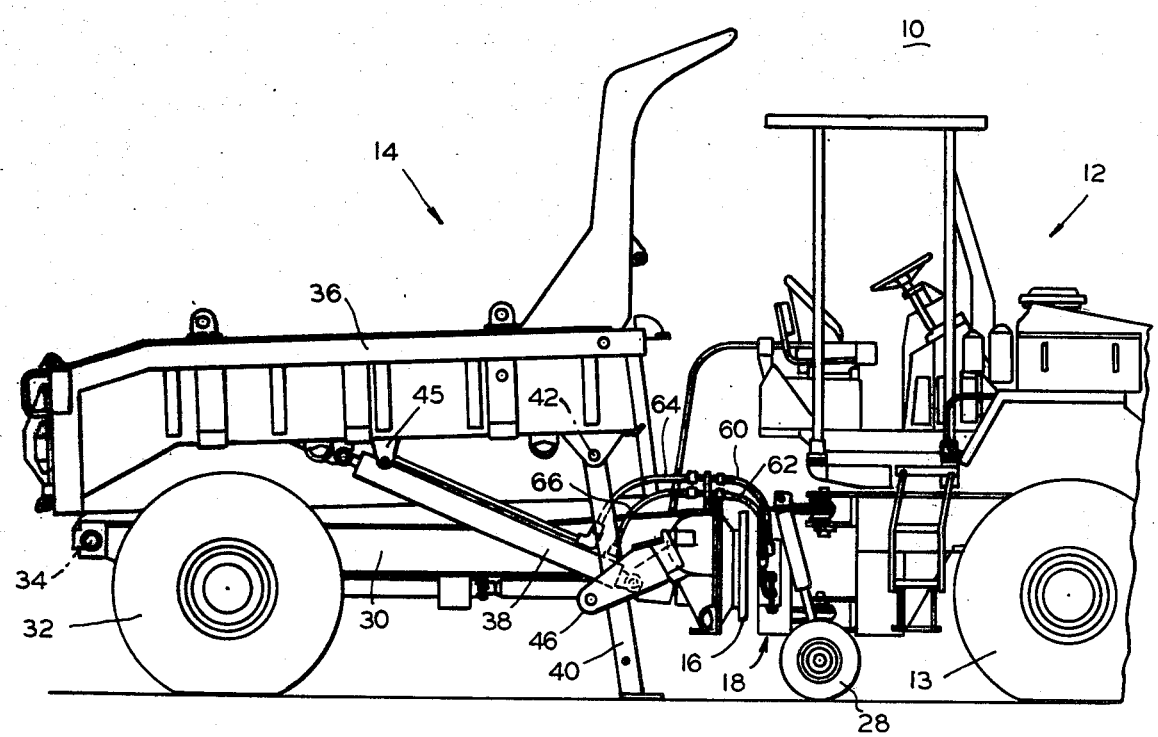
FIG. 3 shows both the implement module and the tractor module, in position for coupling the two modules together to form a complete vehicle as in FIG. 1.

The tractor module 12 and the implement module 14 in FIG. 1 are detachably coupled together and FIG. 3 of the drawing illustrates the two modules slightly separated and ready to be coupled together according to the method of the present invention. A coupling portion 16 on the implement module 14 meshes with and is locked to a coupling portion 18 on the tractor module 12 to make the connection between the two modules.

The truck 10 which is illustrated is a pivot steer type vehicle in which the steering of the truck, while it is in motion, is accomplished by pivoting front portion 12 with respect to the rear portion 14 about a pivot axis 20 through a pair of pivot connections 22 and 24, such pivoting being accomplished by a pair of hydraulic cylinders or actuators controlled by the operator's steering wheel 26. For more details on a similar steering mechanism see U.S. Pat. No. 3,889,976 dated July 15, 1975. It will be appreciated, however, that the present invention is not limited to use with a pivot steered truck but is equally applicable to other types of trucks such as a single frame vehicle with Ackermann steering and other known types.

In the preferred embodiment of the invention disclosed the tractor module 12 is supported on auxiliary wheels 28 when it is detached from the implement module as shown in FIG. 3. It will be appreciated that module 12 is essentially a two wheel tractor with two principal wheels 13, one on each side. The auxiliary wheels 28 are used in maneuvering the tractor module for connection to the implement module and after such connection has been accomplished the auxiliary wheels 28 are retracted as illustrated in FIG. 1. For more information on the manner in which the auxiliary wheels are utilized reference can be had to the previously mentioned U.S. Pat. No. 3,563,329.

Figure 2:
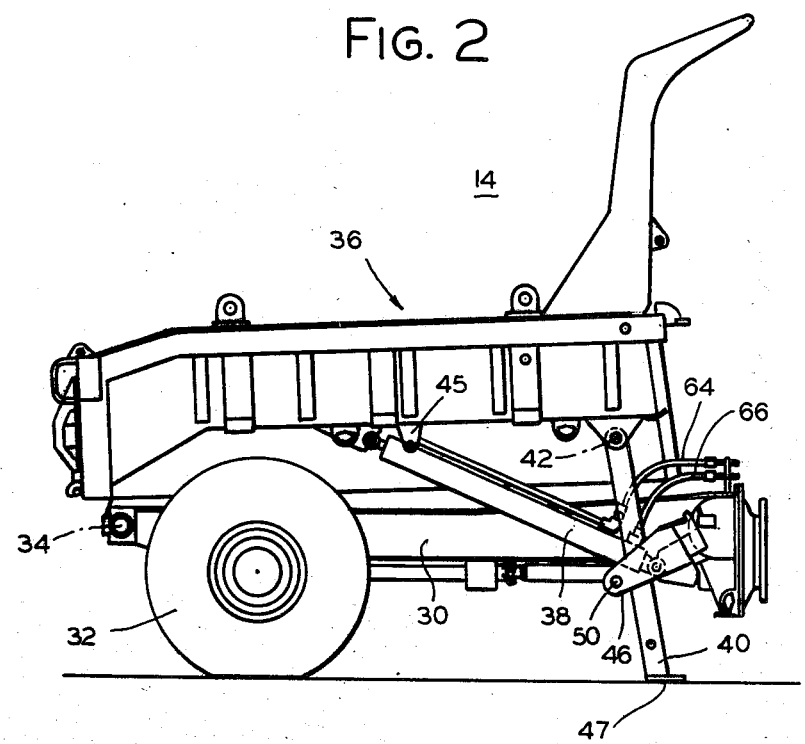
FIG. 2 is a side elevational view of the implement module only.

FIG. 2 of the drawing shows the implement module of the present invention alone in storage condition ready to be coupled to the tractor module. The module 14 of FIG. 2 comprises a horizontally disposed frame 30 with a pair of wheels 32 connected adjacent the rearward end of the frame for providing partial support for the module 14. A dump body 36 is supported on the frame 30 and is pivotally connected to the frame about an axis 34. The dump body 36 is pivotally movable between the normal carrying or transport position illustrated in all three figures of the drawing and a raised dumping position. The pivotal movement of the dump body relative to the frame 30 is carried out by a pair of hydraulic actuators 38, one on each side of the module 14.

The module 14 includes a pair of legs 40, one on each side, pivotally connected at 42 to dump body 36. As shown in FIG. 1, the legs 40 have a storage position in which they are pivoted up to a horizontally disposed position immediately below a bottom surface of dump body 36 and are secured in that position by pins 44 through suitable brackets 45 on the bottom surface of dump body 36.

In FIG. 2, the legs 40 have been pivoted downwardly to positions in which they slant forwardly from the connection 42 with the distal end 47 resting on the ground. In the position of FIG. 2 the legs 40 support the front portions of the module 14, including the frame 30 as well as the dump body 36 while the wheels 32 provide the support at the other end. As shown in FIG. 2, the module 14 is ready to be connected to a tractor module.

FIG. 3 shows the relationship of the two modules after the tractor module 12 has been maneuvered so that coupling portion 18 of the tractor module is in confronting relation with coupling portion 16 on the implement module as the first step in connecting the two modules together. Then, while the legs 40 support the dump body 36 and also indirectly support the frame 30 through the intervening double acting hydraulic actuators 38, a source of pressurized hydraulic fluid on the tractor module is connected to the actuators 38.

As illustrated in FIG. 3 of the drawing, there are two hydraulic lines 60 and 62 on the tractor module 12 which have been connected to the implement module 14, after the tractor module was maneuvered so that coupling portion 18 is in confronting relation with coupling portion 16. In FIG. 3 of the drawing these two hydraulic lines have been connected respectively to hydraulic lines 64 and 66 on the implement module and the latter two hydraulic lines in turn are connected respectively to the rod and head ends of hydraulic actuators 38. Pressurized hydraulic fluid may be supplied in a known manner by a hydraulic pump driven by the engine of the tractor module 12, and a control valve is provided which when actuated, causes the actuators 38 to pivot the front end of frame 30 and coupling portion 16 thereon upwardly and downwardly relative to dump body structure 36, to get the coupling portions 16 in position where the tractor module may be moved toward the implement module to mesh the two coupling portions together.

A preferred coupling structure for utilization with the present invention is the type illustrated in U.S. Pat. No. 3,831,693. Actually, the coupling structure embodied in the module as illustrated is the reverse of that shown in said patent in that the male portion of the coupling is on the implement module and the female portion is on the tractor module. They are similar though in that the two coupling portions have meshing locking ring flanges and there is a lock ring on one portion which is moved behind the segments on the locking ring flange on the other portion to lock the two portions of the coupling together.

A pair of guide brackets 46 are located on opposite sides of frame 30 and arranged to co-act with legs 40. When the legs 40 are in the position of FIG. 2 they are retained between two side plates of the bracket 46 and a pin 50 which is inserted to extend through openings in the side plates. On the fourth side the legs 40 are retained by the closed or bight portion of the brackets 46. For more details on the structure of the brackets 46 and related parts see co-pending application Ser. No. 824,462, filed Aug. 15, 1977.

The arrangement just described makes it possible for frame 30 and the coupling portion 16 thereon to be adjusted upwardly and downwardly as previously mentioned. This is done by operating the actuators 38 to extend them to lower the right end of the frame or to contract them to raise the right end, the brackets 46 moving downwardly and upwardly relative to legs 40. Thus, as previously mentioned, in the condition of FIG. 2 legs 40 support the dump body 36 and the latter in turn supports the frame 30 through the actuators 38, the latter being double acting.

It will be appreciated that the auxiliary wheels 28 also may be adjusted, either individually or jointly, to adjust the position of coupling portion 18 during the connection process to secure proper alignment with coupling portion 16.

While I have described and illustrated herein the best mode contemplated for carrying out this invention, it will be appreciated that modifications may be made by those skilled in the art. Accordingly, it should be understood that I intend to cover by the appended claims all such modifications which fall within the true spirit and scope of my invention.

I claim:

1. The method of connecting together a tractor module and an implement module to form a complete vehicle, wherein the tractor module includes a first coupling portion and a source of pressurized hydraulic fluid, and the implement module includes a frame having a second coupling portion thereon with a hydraulically operated movable structure on the frame portion together with a hydraulic actuator for operating it and legs arranged to be selectively located between the hydraulically operated structure and the ground for supporting the implement module at rest, the method comprising moving the tractor module adjacent the vehicle module so that the two coupling portions are in confronting relation, connecting the source of pressurized hydraulic fluid on the tractor module to the hydraulic actuator for the hydraulically operated structure on the implement module, adjusting the frame of the implement module by moving it relative to the hydraulically operated structure to get the two coupling portions in position for coupling, and moving the tractor module toward the implement module to mesh the two coupling portions together.

2. The method of claim 1 in which the tractor module embodies auxiliary wheels, including the step of adjusting at least one of said auxiliary wheels for adjusting the position of said first coupling portion relative to said second coupling portion.

* * * * *